US008458651B2

(12) United States Patent
Kurian et al.

(10) Patent No.: US 8,458,651 B2
(45) Date of Patent: Jun. 4, 2013

(54) SEAMLESS MIGRATION OF TUXEDO® APPLICATIONS TO A CICS® HOSTING ENVIRONMENT

(75) Inventors: John Kurian, Bangalore (IN); Ajay Sood, Bangalore (IN); Dinoop Thomas, Bangalore (IN); Hariharan N. Venkitachalam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 12/818,311

(22) Filed: Jun. 18, 2010

(65) Prior Publication Data
US 2011/0314443 A1 Dec. 22, 2011

(51) Int. Cl.
G06F 9/44 (2006.01)

(52) U.S. Cl.
USPC .......................................... 717/106; 717/137

(58) Field of Classification Search
USPC .................................. 717/106, 137
See application file for complete search history.

(56) References Cited

U.S. PATENT DOCUMENTS

| 5,854,750 | A  | * | 12/1998 | Phillips et al. ............... 700/216 |
| 6,038,587 | A  | * | 3/2000  | Phillips et al. ............... 718/101 |
| 6,064,813 | A  |   | 5/2000  | Sitbon et al. |
| 6,502,102 | B1 | * | 12/2002 | Haswell et al. ....................... 1/1 |
| 7,124,413 | B1 |   | 10/2006 | Klemm et al. |
| 7,346,929 | B1 | * | 3/2008  | Hammond ...................... 726/25 |
| 7,620,842 | B2 |   | 11/2009 | Fung et al. |
| 7,698,398 | B1 | * | 4/2010  | Lai ................................ 709/223 |
| 7,831,693 | B2 | * | 11/2010 | Lai ................................ 709/220 |
| 8,069,435 | B1 | * | 11/2011 | Lai ................................ 717/106 |
| 2005/0108690 | A1 | * | 5/2005 | Lau et al. ...................... 717/136 |
| 2005/0108691 | A1 | * | 5/2005 | Lau et al. ...................... 717/136 |
| 2005/0108692 | A1 | * | 5/2005 | Lau et al. ...................... 717/136 |
| 2005/0262511 | A1 |   | 11/2005 | Taniai et al. |
| 2006/0200565 | A1 |   | 9/2006  | Ng et al. |
| 2008/0271007 | A1 |   | 10/2008 | Gou |

OTHER PUBLICATIONS

Sneed et al., "Reengineering the Corporation—A Manifesto for IT Evolution", 2001.*
Harry M. Sneed, Encapsulation of legacy software: A technique for reusing legacy software components, Article, Annals of Software Engineering, 2000, p. 293, vol. 9, Issue 1-4, J. C. Baltzer AG, Science Publishers, Red Bank, NJ, USA.

(Continued)

Primary Examiner — Phillip H Nguyen
(74) Attorney, Agent, or Firm — Lee Law, PLLC; Christopher B. Lee

(57) ABSTRACT

Source code for a transactions on Unix® extended for distributed operation (Tuxedo®) application, is parsed by an application migration module. At least one application service routine that each specifies a Tuxedo® service within the parsed source code is identified. At least one identified application service routine includes at least one associated application-to-transaction manager (ATMI) application programming interface (API) routine. Stub code that includes an invocation call for an associated customer information control system service for each application service routine identified within the source code is generated. A customer information control system environment executable is created based upon the source code, the stub code, glue code, and a migration library. The migration library includes, for each associated ATMI API routine, a mapping routine that processes data format differences between each ATMI API routine and at least one associated customer information control system API routine.

24 Claims, 7 Drawing Sheets

OTHER PUBLICATIONS

Juan M. Andrade, Mark T. Carges, M. Randall MacBlane, Open On-line Transaction Processing with the Tuxedo® System, Article, Proceedings of the 37th International Conference on COMPCON, 1992, pp. 366-371, IEEE Computer Society Press, Los Alamitos, CA, USA.

Joab Jackson, Oracle Poaching IBM Mainframe Users with Tuxedo, Article, Website/page: http://www.computerworlduk.com/technology/hardware/mainframes-supercomputers/news/index.cfm?newsid=19691, Apr. 1, 2010, pp. 1-2, ComputerworldUK, Published on the World Wide Web.

Mark Rakhmilevich, Mainframe Rehosting with Oracle Tuxedo: Accelerating Cost Reduction and Application Modernization, White Paper, Mar. 2009, pp. 1-37, Oracle Corporation, Redwood Shores, CA, USA.

* cited by examiner

400

US 8,458,651 B2

SEAMLESS MIGRATION OF TUXEDO® APPLICATIONS TO A CICS® HOSTING ENVIRONMENT

BACKGROUND

The present invention relates to application migration from one platform to another. More particularly, the present invention relates to seamless migration of Tuxedo® (Transactions on Unix® extended for distributed Operation) applications to a CICS® (Customer Information Control System) hosting environment.

Tuxedo® is a middleware product that is used for creation and administration of on-line transaction processing (OLTP) applications. It functions as a transaction monitor to initiate, monitor, and control transactions spanning across multiple databases in multiple machines.

CICS® is a transaction server that runs primarily on IBM® mainframe systems under a z/OS® operating platform and also on distributed platforms. It is a transaction manager designed for rapid, high-volume OLTP.

BRIEF SUMMARY

A method includes parsing, via an application migration module, source code for a transactions on Unix extended for distributed operation application; identifying at least one application service routine that each specifies an associated transactions on Unix extended for distributed operation service within the parsed source code, where at least one identified application service routine comprises at least one associated application-to-transaction manager (ATMI) application programming interface (API) routine; generating stub code comprising an invocation call for an associated customer information control system service for each application service routine identified within the source code; and creating a customer information control system environment executable based upon the source code, the stub code, glue code, and a migration library comprising, for each associated ATMI API routine, a mapping routine that processes data format differences between each ATMI API routine and at least one associated customer information control system API routine.

A system includes a memory and a processor programmed to: parse source code for a transactions on Unix extended for distributed operation application; identify at least one application service routine that each specifies an associated transactions on Unix extended for distributed operation service within the parsed source code, where at least one identified application service routine comprises at least one associated application-to-transaction manager (ATMI) application programming interface (API) routine; generate stub code comprising an invocation call for an associated customer information control system service for each application service routine identified within the source code; and create a customer information control system environment executable within the memory based upon the source code, the stub code, glue code, and a migration library comprising, for each associated ATMI API routine, a mapping routine that processes data format differences between each ATMI API routine and at least one associated customer information control system API routine.

A computer program product includes a computer readable storage medium including a computer readable program, where the computer readable program when executed on a computer causes the computer to: parse source code for a transactions on Unix extended for distributed operation application; identify at least one application service routine that each specifies an associated transactions on Unix extended for distributed operation service within the parsed source code, where at least one identified application service routine comprises at least one associated application-to-transaction manager (ATMI) application programming interface (API) routine; generate stub code comprising an invocation call for an associated customer information control system service for each application service routine identified within the source code; and create a customer information control system environment executable based upon the source code, the stub code, glue code, and a migration library comprising, for each associated ATMI API routine, a mapping routine that processes data format differences between each ATMI API routine and at least one associated customer information control system API routine.

DETAILED DESCRIPTION

Figure 1:
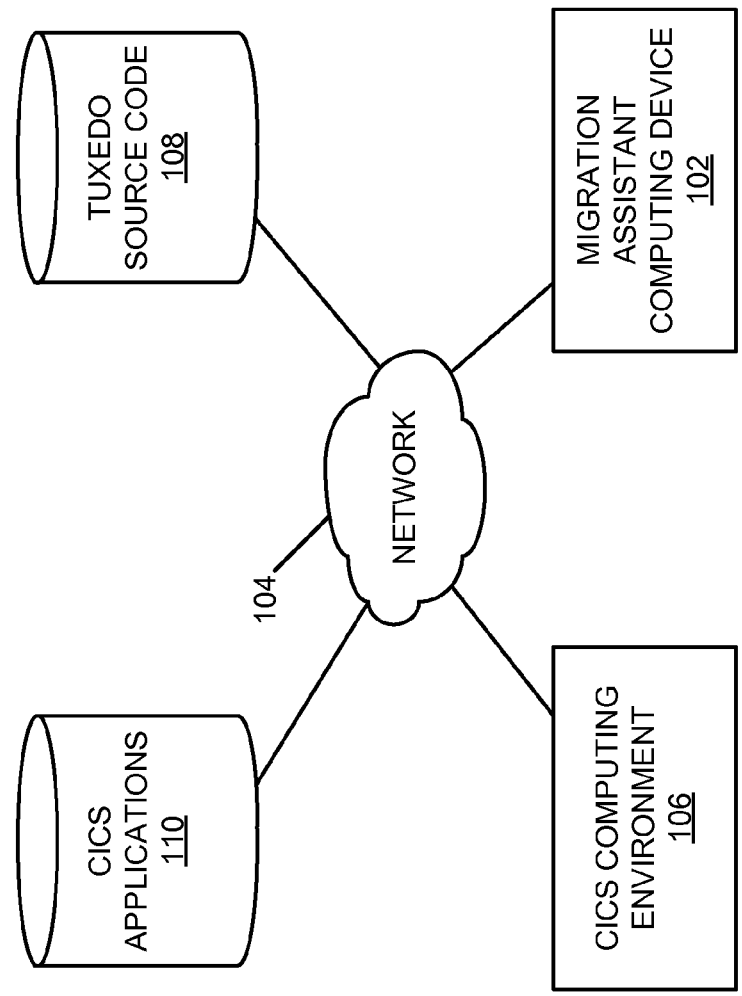
FIG. 1 is a block diagram of an example of an implementation of a system for automated seamless migration of Tuxedo® applications to a CICS® hosting environment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated seamless migration of Tuxedo® applications to a CICS® hosting environment. Based upon the present description, CICS® may replace Tuxedo® within a customer's business processes without requiring any change to a customer's Tuxedo® source code.

Both Tuxedo® and CICS® provide transaction management and associated transaction server capabilities. There are differences in the architecture and working methodology between these two products with respect to achieving the same transactional task. Examples of functional areas where the differences arise within the two environments include, but are not limited to: (1) the method of application (service) deployment and execution; (2) the method of passing the inputs (initialization parameters, user data, etc.,) to the service; (3) the method of invoking initialization functions when the service starts; (4) the method of supporting implicit and explicit transactions; (5) the method of pre-initializing the language runtime; (6) the method of user data transfer between client and server components; and (7) the method of application memory management.

For purposes of the present description, Tuxedo® applications, source code, routines, and other references may also be termed "TUX Extended for Distributed Operation" applications, source code, routines, etc. It is understood that Unix® is an open operating system. As such, for purposes of the present description, references to Tuxedo® represent an environment and/or application, source code, routines, and other references that support transactions for distributed operations on open systems, application transactions on distributed operating systems, and application transactions on open platform operating systems, as appropriate for a given reference or implementation.

As a result of the example above-referenced differences, migration of an existing application from a Tuxedo® environment to a CICS® environment may be a formidable task. The present subject matter allows automated seamless migration of Tuxedo® applications to a CICS® hosting environment without requiring changes to the existing Tuxedo® applications or to their deployment methodology.

It should be noted that while the present subject matter is described using the CICS® environment as an example target environment, the present subject matter may also be used and applied to other target environments, such as Clerity® Unikix®, TMAX®, and others. Certain modifications to the present subject matter for migration of Tuxedo® applications to such other target environments will become apparent to one of ordinary skill in the art based upon the description below.

Certain aspects described below may be applied to any such target environment, and are detailed below for the CICS® environment. These aspects include, among other things, (1) a method of generating stub code that facilitates keeping the existing Tuxedo® applications unchanged, and that supports multiple services that are part of the same Tuxedo® application module; (2) a method by which both an existing Tuxedo® application and the target environment are glued together; (3) a method by which services to be invoked in the environment are identified when multiple services are defined in the same Tuxedo® application module; (4) a method of passing command line parameters of the Tuxedo® application to the associated service in the target environment; (5) a method of deploying the services associated with the Tuxedo® application to built-in functionality within the target environment build infrastructure; (6) a method of mapping Tuxedo® services into target environment services using a migration assistant library (MAL); (7) a method of handling separate input/output data buffers passed to the "tpcall" interface of the Tuxedo® application to the single (e.g., COMMAREA) data buffer maintained in the target environment; and (8) a method of mapping the Tuxedo® initialization methodology to target environment. Each of these aspects will be described in detail below for automated seamless migration of Tuxedo® applications to a CICS® hosting environment. Modifications to the processing described below may be utilized as appropriate for any other target environment in further considerations of known differences with respect to interfaces and available services associated with any such target environment.

As described in more detail below, an automated migration assistant computing device provides the processing to seamlessly migrate a Tuxedo® application to a CICS® environment. The migration assistant computing device provides services for implementation of the various aspects of the present subject matter and resulting artifacts are deployed directly on to the CICS® environment.

The automated seamless migration of Tuxedo® applications to a CICS® hosting environment described herein may be performed in real time to allow prompt migration of Tuxedo® applications to a target environment, such as the CICS® environment. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second, within a few seconds, within a few minutes). These terms, while difficult to precisely define are well understood by those skilled in the art.

FIG. 1 is a block diagram of an example of an implementation of a system 100 for automated seamless migration of Tuxedo® applications to a CICS® hosting environment. A migration assistant computing device 102 interconnects and communicates via a network 104 with a CICS® computing environment 106. A Tuxedo® source code repository 108 and a CICS® application repository 110 are also accessible by the migration assistant computing device 102 via the network 104.

As will be described in more detail below in association with FIG. 2 through FIG. 7, the migration assistant computing device 102 provides automated seamless migration of Tuxedo® applications to a CICS® hosting environment. The automated seamless migration of Tuxedo® applications to a CICS® hosting environment is based upon analysis of source code associated with the Tuxedo® application to be migrated. Available services implemented by the source code are identified, and stub code is generated. An initialization framework for services and for invocation of appropriate services within the CICS® environment is provided by glue code. Tuxedo® application-to-transaction manager interface (ATMI) application programming interface (API) routines are defined and mapped within a migration assistant library (MAL). The Tuxedo® application is compiled for the CICS® environment along with the stub code, and built and linked with migration assistant library and glue code. As a result, the Tuxedo® application is transformed to execute within the CICS® environment and to fulfill the services of the Tuxedo® application.

The glue code provides linkages between existing Tuxedo® applications and the CICS® environment. For example, the glue code implements an entry point that allows the Tuxedo® application to run within the CICS® environment. The entry point prepares and initializes the CICS® environment, prepares the command-line parameters to be passed to the Tuxedo® application, identifies which services to be invoked, and passes the program data to the Tuxedo® application within the CICS® environment. The glue code may, for example, be compiled into a separate object code module that may be linked in with the compiled Tuxedo® application, the stub code, and the migration assistant library. Alternatively, the glue code may form a portion of the stub code without departure from the scope of the present subject matter.

It should be noted that the migration assistant computing device 102 may be any computing device capable of processing information as described above and in more detail below. For example, the migration assistant computing device 102 may include devices such as a server or personal computer (e.g., desktop, laptop, palm, etc.), a handheld device (e.g., cellular telephone, personal digital assistant (PDA), or any other device capable of processing information as described in more detail below.

The CICS® computing environment 106 is illustrated as a single device for ease of description purposes. However, it is understood that the CICS® computing environment may be implemented as one or more physical computing devices without departure from the scope of the present subject matter.

The network 104 may include any form of interconnection suitable for the intended purpose, including a private or public network such as an Intranet or the Internet, respectively, direct inter-module interconnection, dial-up, wireless, or any other interconnection mechanism capable of interconnecting the respective devices.

The Tuxedo® source code repository 108 and the CICS® application repository 110 may include any form of storage suitable for storing the respective code elements. The Tuxedo® source code repository 108 may, for example, be located at a customer location and store the customer's Tuxedo® source code, while the CICS® application repository 110 may located at the same or a different location. The CICS® application repository 110 may store source code for the CICS® environment. Additionally, the CICS® application repository 110 may store stub when generated, as well as the migration assistant library routines and glue code. The Tuxedo® source code repository 108 may also store the final build for the CICS® environment or the final build may be stored within the CICS® application repository 110. It should be noted that though the present description shows the Tuxedo® source code repository 108 and the CICS® application repository 110 as two separate storage devices for convenience, the Tuxedo® source code repository 108 and the CICS® application repository 110 may be implemented as a single storage device without departure from the scope of the present subject matter as appropriate for a given implementation.

Additionally, though the migration assistant computing device 102 is illustrated as a separate device within the system 100, the migration assistant computing device 102 may form a portion of the CICS® computing environment 106. As such, many variations on the examples shown and described herein are possible and all such variations are considered within the scope of the present subject matter.

Figure 2:
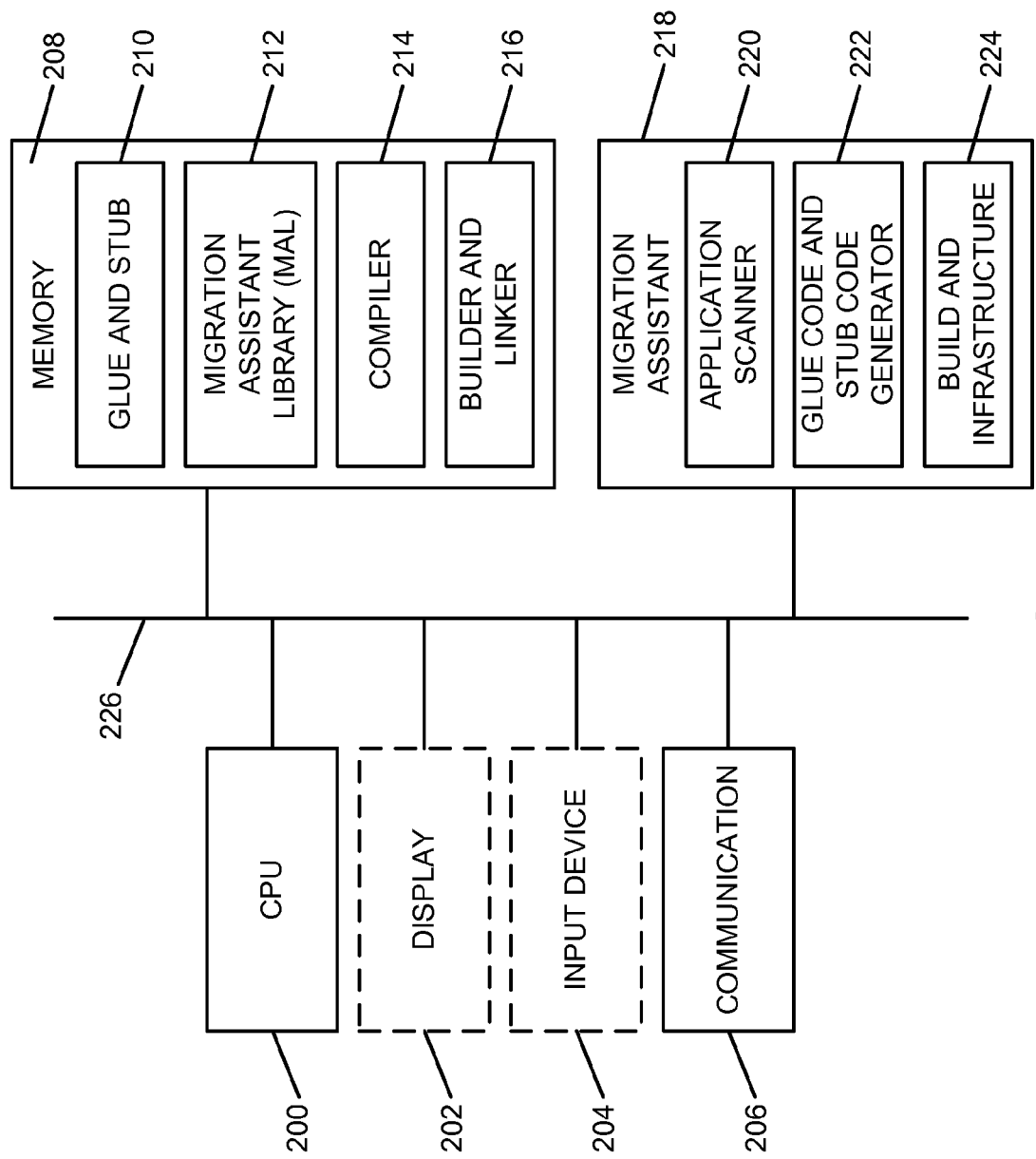
FIG. 2 is a block diagram of an example of an implementation of a migration assistant computing device capable of performing automated seamless migration of Tuxedo® applications to a CICS® hosting environment according to an embodiment of the present subject matter.

FIG. 2 is a block diagram of an example of an implementation of the migration assistant computing device 102 capable of performing automated seamless migration of Tuxedo® applications to a CICS® hosting environment. A central processing unit (CPU) 200 provides computer instruction execution, computation, and other capabilities within the migration assistant computing device 102. A display 202 provides visual information to a user of the migration assistant computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the migration assistant computing device 102 for certain implementations. Accordingly, the migration assistant computing device 102 may operate as a completely automated embedded device without user configurability or feedback. However, the migration assistant computing device 102 may also provide user feedback and configurability via the display 202 and the input device 204, respectively.

A communication module 206 provides interconnection capabilities that allow the migration assistant computing device 102 to communicate with other modules within the system 100, such as the CICS® computing environment 106, to provide the automated seamless migration of Tuxedo® applications to a CICS® hosting environment described herein. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a glue and stub code storage area 210, a migration assistant library (MAL) storage area 212, a compiler 214, and a builder and linker 216. The glue and stub code storage area 210 stores glue and stub code generated by the migration assistant computing device 102 during migration activities. The glue and stub code may be stored after completion of a build within the CICS® application repository 110 or the glue and stub code storage area 210 may form a longer-term primary storage location for glue and stub code with a copy of the glue and stub code stored in the CICS® application repository 110 for archival purposes along with a migrated Tuxedo® application build.

The migration assistant library (MAL) storage area 212 stores migration assistant library routines for migration of a Tuxedo® application to the CICS® environment. The migration assistant library routines may be retrieved from the CICS® application repository 110 during a migration process or may be stored within the migration assistant library (MAL) storage area 212 for longer-term primary storage.

The compiler 214 provides application level support for compilation of the Tuxedo® application and the glue and stub code. Though it is presumed for purposes of the present example that the migration assistant library routines are pre-compiled and stored within the migration assistant library (MAL) storage area 212, the compiler 214 may also compile the migration assistant library routines without departure from the scope of the present subject matter.

The builder and linker 216 provides building and linking functionality for the migration assistant computing device 102. The builder and linker 216 constructs and links compiled modules generated by the compiler 214 and/or retrieved from the migration assistant library (MAL) storage area 212.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A migration assistant module 218 is also illustrated. The migration assistant module 218 provides application migration processing capabilities for the migration assistant computing device 102, as described above and in more detail below. The migration assistant module 218 implements the automated seamless migration of Tuxedo® applications to a CICS® hosting environment of the migration assistant computing device 102.

The migration assistant module 218 includes an application scanner module 220, a glue code and stub code generation module 222, and a build and infrastructure module 224. The application scanner module 220 provides parsing and scanning capabilities for source code of a Tuxedo® application and identifies available application service routines that specify associated Tuxedo® services within the Tuxedo® application that are to be ported to the CICS® environment. The glue code and stub code generation module 222 automatically generates stub code that includes an invocation call for an associated customer information control system service for each application service routine identified within the source code. The glue code and stub code generation module 222 also generates glue code, though as discussed above and in more detail below, the glue code may be previously generated and compiled to an object code module. The glue code provides an initialization framework for services, and for invocation of appropriate services within the CICS® environment. The build and infrastructure module 224 manages build and infrastructure issues for invoking compilation of the respective code modules by the compiler 214 and build and linking functionality by the builder and linker 216.

It should be noted that the migration assistant module 218 is shown to include, for ease of illustration purposes, the various elements described above for the various functionality provided by the migration assistant module 218. However, it is understood that the migration assistant module 218 may include a single processing module that manages the various functions described herein without departure from the scope of the present subject matter.

Though the migration assistant module 218 is illustrated as a component-level module for ease of illustration and description purposes, it should be noted that the migration assistant module 218 may include any hardware, programmed processor(s), and memory used to carry out the functions of this module as described above and in more detail below. For example, the migration assistant module 218 may include additional controller circuitry in the form of application specific integrated circuits (ASICs), processors, and/or discrete integrated circuits and components for performing communication and electrical control activities associated with the respective devices. Additionally, the migration assistant module 218 may also include interrupt-level, stack-level, and application-level modules as appropriate. Furthermore, the migration assistant module 218 may include any memory components used for storage, execution, and data processing for performing processing activities associated with the module.

It should also be noted that the migration assistant module 218 may form a portion of other circuitry described without departure from the scope of the present subject matter. Further, the migration assistant module 218 may alternatively be implemented as one or more applications stored within the memory 208. In such an implementation, the migration assistant module 218 may include instructions executed by the CPU 200 for performing the functionality described herein. The CPU 200 may execute these instructions to provide the processing capabilities described above and in more detail below for the migration assistant computing device 102. The migration assistant module 218 may form a portion of an interrupt service routine (ISR), a portion of an operating system, a portion of a browser application, or a portion of a separate application without departure from the scope of the present subject matter.

The CPU 200, the display 202, the input device 204, the communication module 206, the memory 208, and the migration assistant module 218 are interconnected via an interconnection 226. The interconnection 226 may include a system bus, a network, or any other interconnection capable of providing the respective components with suitable interconnection for the respective purpose.

While the migration assistant computing device 102 is illustrated with and has certain components described, other modules and components may be associated with the migration assistant computing device 102 without departure from the scope of the present subject matter. Additionally, it should be noted that, while the migration assistant computing device 102 is described as a single device for ease of illustration purposes, the components within the migration assistant computing device 102 may be co-located or distributed and interconnected via a network without departure from the scope of the present subject matter. For a distributed arrangement, the display 202 and the input device 204 may be located at a terminal, kiosk, or other location, while the CPU 200 and memory 208 may be located at a local or remote server. Many other possible arrangements for components of the migration assistant computing device 102 are possible and all are considered within the scope of the present subject matter. It should also be understood that, though the glue and stub code storage area 210, the migration assistant library (MAL) storage area 212, the compiler 214, and the builder and linker 216 are illustrated as being stored within the memory 208, these elements may be stored within either the Tuxedo® source code repository 108 or the CICS® application repository 110 without departure from the scope of the present subject matter. Accordingly, the migration assistant computing device 102 may take many forms and may be associated with many platforms.

FIG. 3 through FIG. 7 below describe example processes that may be executed by such devices, such as the migration assistant computing device 102, to perform the automated seamless migration of Tuxedo® applications to a CICS® hosting environment associated with the present subject matter. Many other variations on the example processes are possible and all are considered within the scope of the present subject matter. The example processes may be performed by modules, such as the migration assistant module 218 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

Figure 3:
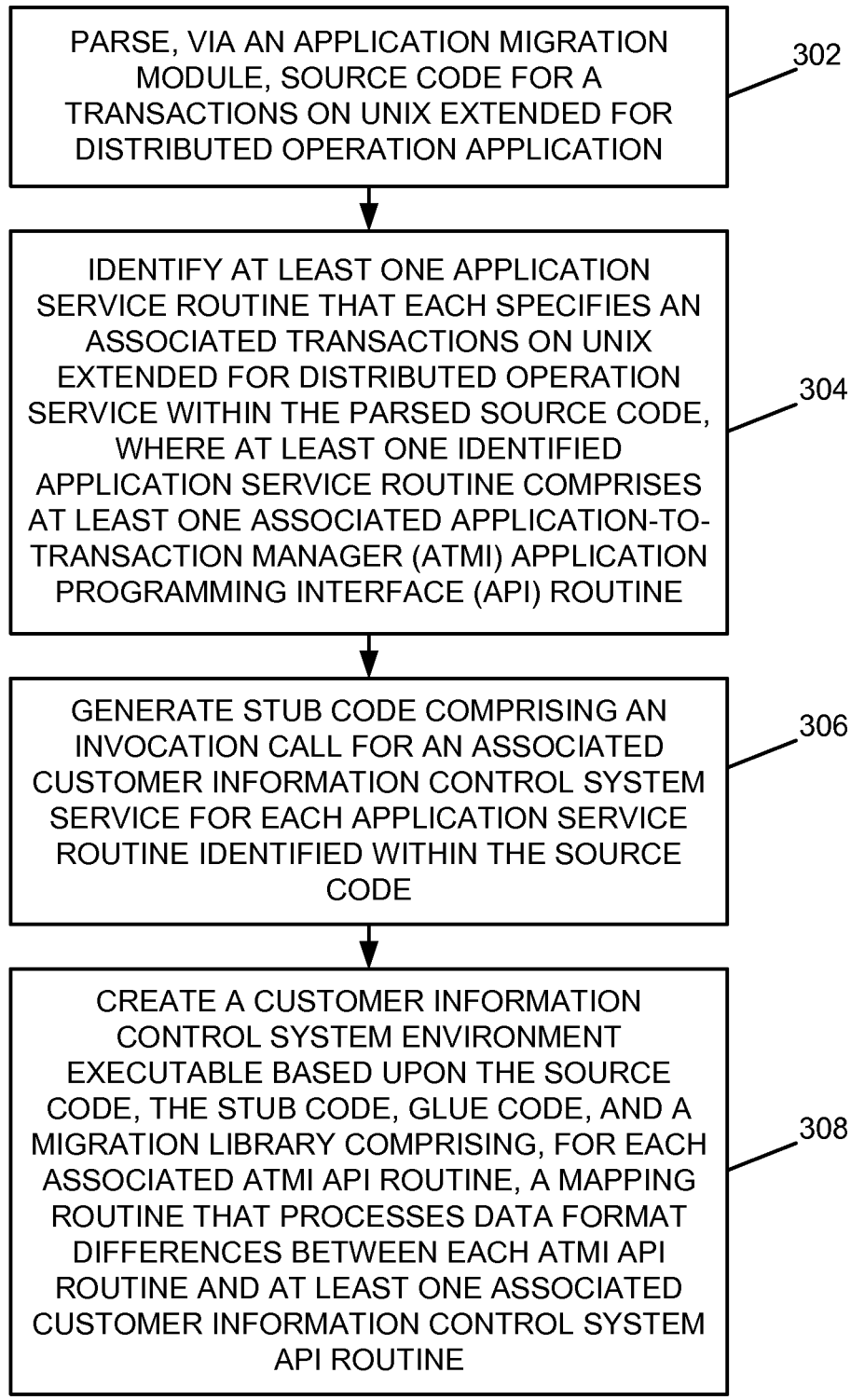
FIG. 3 is a flow chart of an example of an implementation of a process for automated seamless migration of Tuxedo® applications to a CICS® hosting environment according to an embodiment of the present subject matter.

FIG. 3 is a flow chart of an example of an implementation of a process 300 for automated seamless migration of Tuxedo® applications to a CICS® hosting environment. At block 302, the process 300 parses, via an application migration module, source code for a transactions on Unix® extended for distributed operation application. At block 304, the process 300 identifies at least one application service routine that each specifies an associated transactions on Unix extended for distributed operation service within the parsed source code, where at least one identified application service routine comprises at least one associated application-to-transaction manager (ATMI) application programming interface (API) routine. At block 306, the process 300 generates stub code comprising an invocation call for an associated customer information control system service for each application service routine identified within the source code. At block 308, the process 300 creates a customer information control system environment executable based upon the source code, the stub code, glue code, and a migration library comprising, for each associated ATMI API routine, a mapping routine that processes data format differences between each ATMI API routine and at least one associated customer information control system API routine.

Figure 4:
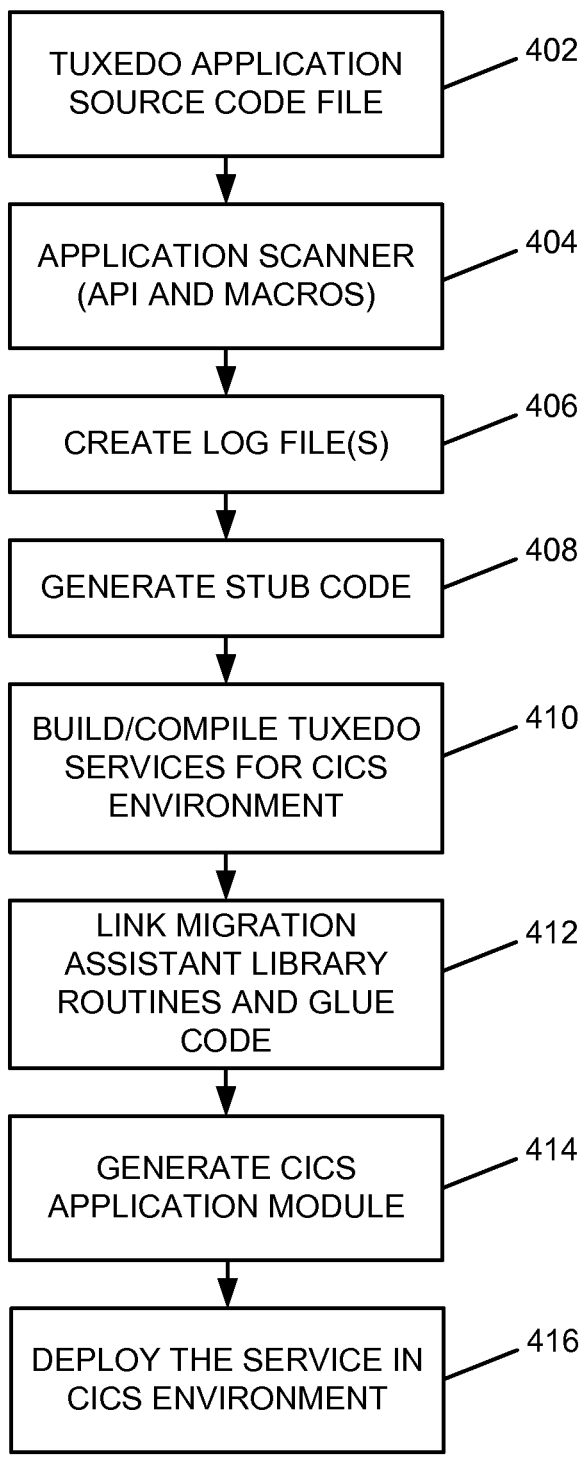
FIG. 4 is a flow chart of an example of an implementation of a process that illustrates additional detailed processing associated with automated seamless migration of Tuxedo® applications to a CICS® hosting environment according to an embodiment of the present subject matter.

FIG. 4 is a flow chart of an example of an implementation of a process 400 that illustrates additional detailed processing associated with automated seamless migration of Tuxedo® applications to a CICS® hosting environment. Certain processes of the process 400 will be expanded upon in more detail within the figures that follow. For purposes of the present example, it is assumed that the Tuxedo® application to be migrated to the CICS® environment is an application-to-transaction manager interface (ATMI) Tuxedo® application.

At block 402, the process 400 retrieves and inputs the Tuxedo® ATMI-based application source file for processing by the migration assistant module 218. The following pseudo code of a sample Tuxedo® ATMI server application is shown for purposes of illustration of the present example. It should be understood that the pseudo code examples herein are for reference and ease of description purposes, and that different and additional code may be appropriate based upon the given implementation.

```
/* Service definition */
void Service1 (TPSVCINFO *request_svc)
{
    int ilen, olen;
    char *request_buffer;
    char * reply_buffer;
    ...
    request_buffer = (char *) request_svc->data
    tpcall ("Service4", buffer, strlen (buffer), &reply_buffer, &olen);
    ...
```

```
    return;
}
/* Service definition */
void Service2 (TPSVCINFO * request_svc)
{
    char * buffer;
    ...
    buffer = (char *) request_svc->data;
    tpacall ("Service4", buffer, strlen (buffer), NULL);
    ...
    return;
}
```

As can be seen from the above pseudo code, certain lines represent Tuxedo® ATMI application programming interface (API) function calls. As can also be seen from the above pseudo code, an ATMI API function call named "tpcall" is shown within a routine titled "Service1." Similarly, an ATMI API function call named "tpacall" is shown within a routine titled "Service2." A person of skill in the art of Tuxedo® ATMI API routines will understand the respective functionality associated with the "tpcall" and the "tpacall" routines. As such, details of the functional purpose of these routines are omitted herein for brevity.

Additionally, the above pseudo code shows one ATMI API routine associated with each of the "Service 1" and the "Service 2." However, it should be noted that a Tuxedo® service may include multiple ATMI API calls and that each ATMI API call may map to at least one CICS® API routine within the CICS® environment. Further, ATMI API calls are resolved to the respective one or more CICS® API routines at runtime via the migration assistant library. It should also be noted that a given Tuxedo® application service routine may or may not have an ATMI API call. If a given Tuxedo® application service routine does not have an ATMI API call, then no CICS® API routine will be invoked.

At block 404, the process 400 scans (e.g., parses) the input application source file and identifies Tuxedo®-specific ATMI API and Macros definitions. For purposes of the present example, it is understood that the process 400 will identify the ATMI API calls associated with the functionality titled "Service1" and "Service2." At block 406, the process 400 creates one or more log files that list the Tuxedo® ATMI API and macro definitions identified within the scanned/parsed Tuxedo® ATMI server application that are supported within the CICS® environment.

At block 408, the process 400 generates appropriate stub code to support the migration of the Tuxedo® ATMI server application to the CICS® environment. Stub code may be considered code that is generated in real time during migration to support variable service-related functionality of the Tuxedo® ATMI server application, such as the "Service1" and "Service2" described above.

At block 410, the process 400 builds and compiles the Tuxedo® ATMI server application for the CICS® environment. The process 400 provides a similar build infrastructure to that of Tuxedo® to build and deploy applications on a CICS® environment, including generation and compilation of stub and glue code, as described above and in more detail below. More details on the processing at step 408 are described below in association with FIG. 5 below. At block 412, the process 400 links the generated and compiled code elements with the migration assistant library (MAL) routines, that provide interfaces that are mapped to the Tuxedo® ATMI API interfaces and the macro definitions within the CICS® environment that are used by the Tuxedo® ATMI server application, and the glue code that provides an initialization framework for services, and for invocation of appropriate services within the CICS® environment. At block 414, the process 400 generates an output module to load within the CICS® environment when a service is invoked.

At block 416, the process 400 deploys the module within the CICS® environment automatically. Deployment within the CICS® environment registers the services (e.g., "Service1" and "Service2" within the present example) to the CICS® environment. It should be noted that all services would point to the same application module that was built since all services reside in the same Tuxedo® ATMI server application source file. This differs from CICS® native services that are each defined within a single application module. It should be noted that if a CICS® environment is not presently deployed, the process 400 may also build and deploy a CICS® environment.

As such, the process 400 provides services for scanning and parsing a Tuxedo® ATMI server application. The process 400 generates stub code to support migration of the Tuxedo® ATMI server application to the CICS® environment. The process 400 compiles, builds, and links the Tuxedo® ATMI server application with the generated stub, the glue code, and migration assistant library (MAL) routines. The process 400 generates an output module to load within the CICS® environment when a service is invoked. Accordingly, the process 400 illustrates higher-level processing associated with automated seamless migration of Tuxedo® applications to a CICS® hosting environment. Additional details of certain processing are described below in association with FIG. 5 through FIG. 7. It should be noted that the process 400 may also be modified to generate the glue code without departure from the scope of the present subject matter.

Figure 5:
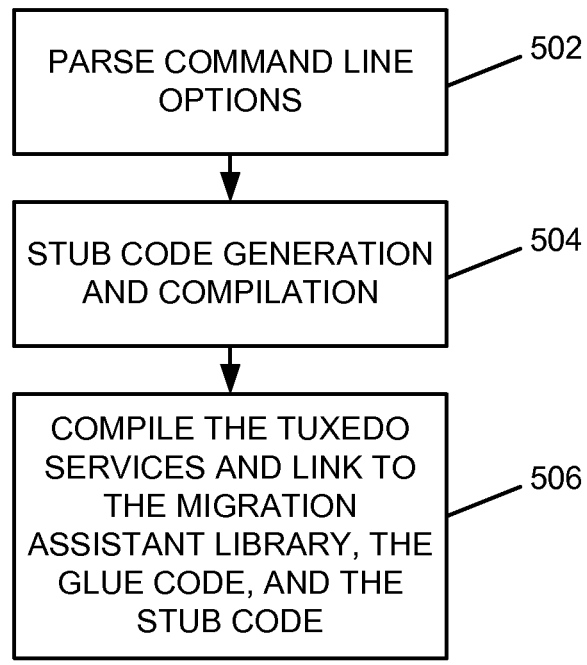
FIG. 5 is a flow chart of an example of an implementation of a process relative to the processing described above in association with FIG. 4 for generation of stub code associated with automated seamless migration of Tuxedo® applications to a CICS® hosting environment according to an embodiment of the present subject matter.

FIG. 5 is a flow chart of an example of an implementation of a process 500 that begins relative to block 408 described above in association with FIG. 4 for generation of stub code associated with automated seamless migration of Tuxedo® applications to a CICS® hosting environment. It should be noted that some of the processing described within the process 500 may be redundant with and expand upon the processing described above in association with the process 400 of FIG. 4.

At block 502, the process 500 compiles the Tuxedo® ATMI server application through a command-line tool that provides a similar interface of the build command in a Tuxedo® environment. Arguments to this command-line tool are parsed and mapped according to the rules of building applications in the CICS® environment.

It should be understood that Tuxedo® applications may include more than one service function within each application module. In contrast, within a CICS® environment there may only be one service registered for every application module. As such, a conventional migration may require an application change if such a Tuxedo® application is migrated to run in the CICS® environment, wherein each service is separated to form its own application module. In contrast to such an approach, the present subject matter keeps the existing Tuxedo® application unchanged. To accommodate the present subject matter, different services within such a Tuxedo® application are registered to CICS®, but each of the registered services would load the same Tuxedo® application module when the service request is made. Within a CICS® environment, as soon as the application module is loaded, the "main" entry point is invoked. The "main" entry point would then invoke the appropriate service at run-time as a function call. To enable this capability for a migrated Tuxedo® application, the present build system generates stub code that includes appropriate invocation calls for every application service routine identified in the Tuxedo® application source code/file.

As such, at block 504, the process 500 generates stub code for identified application service routines within the example Tuxedo® ATMI server application. A default stub code template may be provided from which stub code generation is performed. The template forms a skeleton for the stub code. The template may include any necessary header files, variables declarations, global variable declarations, and positioning markers. The position markers may be used for adding each service definition found in the Tuxedo® application dynamically.

The following pseudo code represents example stub code generated after compilation section for variable application service routines within the example Tuxedo® ATMI server application. As with the example pseudo code shown above, the following pseudo code assumes the Tuxedo® ATMI-based application has two services defined, namely "Service1" and "Service2" that are identified during processing at block 502 (and at block 404 of FIG. 4 described above).

```
#define ENDOF_TUXSVCNAMES_DECL
   if(/* DUMMY CONDITION */0);
#define ENDOF_TUXSVCNAMES_INVK
   if(/* DUMMY CONDITION */0);
#define INVOKE_SVC_IF(_svcnm_, _svcfn_) {
   if(!strcmp(pgmid, _svc nm_)) {
      _svcfn_(_tpsvcinfo); }
   }
...
   void INVOKE_SVC (char *pgmid, TPSVCINFO *_tpsvcinfo)
   {
      extern void Service1(TPSVCINFO *);
      extern void Service2 (TPSVCINFO *);
      ENDOF_TUXSVCNAMES_DECL
      ...
      INVOKE_SVC_IF("Service1", Service1);
      INVOKE_SVC_IF("Service2", Service2);
      ENDOF_TUXSVCNAMES_INVK
   }
```

As can be seen from the above pseudo code, routines for the "Service1" and "Service2" of the example Tuxedo® ATMI server application are defined as external (e.g., "extern") functions within a routine "INVOKE_SVC." A macro "ENDOF_TUXSVCNAMES_DECL" defines (e.g., marks a position of) an end of a section for service declarations within the "INVOKE_SVC" routine. Similarly, a macro "ENDOF_TUXSVCNAMES_INVK" defines (e.g., marks a position of) an end of service invocation function calls for each identified service within the example Tuxedo® ATMI server application. A third macro, "INVOKE_SVC_IF" maps the respective service to be invoked to the compiled service function within the compiled example Tuxedo® ATMI server application via the "_svcfn_" variable name.

Accordingly, this stub code may be generated automatically in response to parsing the source code of the Tuxedo® application that is to be migrated. As discussed above, efficiency of migration scanning and glue/stub code generation may be improved by defining certain routines as "fixed" routines, where these routines are always anticipated to be available within a given Tuxedo® application. In such a situation, the process 500 may retrieve the appropriate glue code rather than generate the code.

At block 506, the process 500 compiles the Tuxedo® ATMI server application, the glue code, and stub code, such as with the compiler 214 described above. The generated stub code forms an object code module (e.g., ".cics_stub.o"). The object code may be generated in a temporary directory, and removed soon after the application is built. The process 400 also links the Tuxedo® ATMI server application with the migration assistant library (MAL) routines and the compiled glue code and stub code using CICS® build tools, such as the builder and linker 216 described above. A CICS®-loadable module results from this compilation and building processing.

It should be noted that the glue code provides an initialization framework for services, and for invocation of appropriate services within the CICS® environment. The glue code also prepares command-line parameters and identifies which service is being invoked in association with execution of a Tuxedo® application. A mapping layer for Tuxedo® services to CICS® services within the migration assistant library (MAL) provides Tuxedo®-specific ATMI APIs and other macro definitions that are mapped to the respective CICS®-specific APIs and macro definitions. Other services may also be mapped within this layer.

Figure 6:
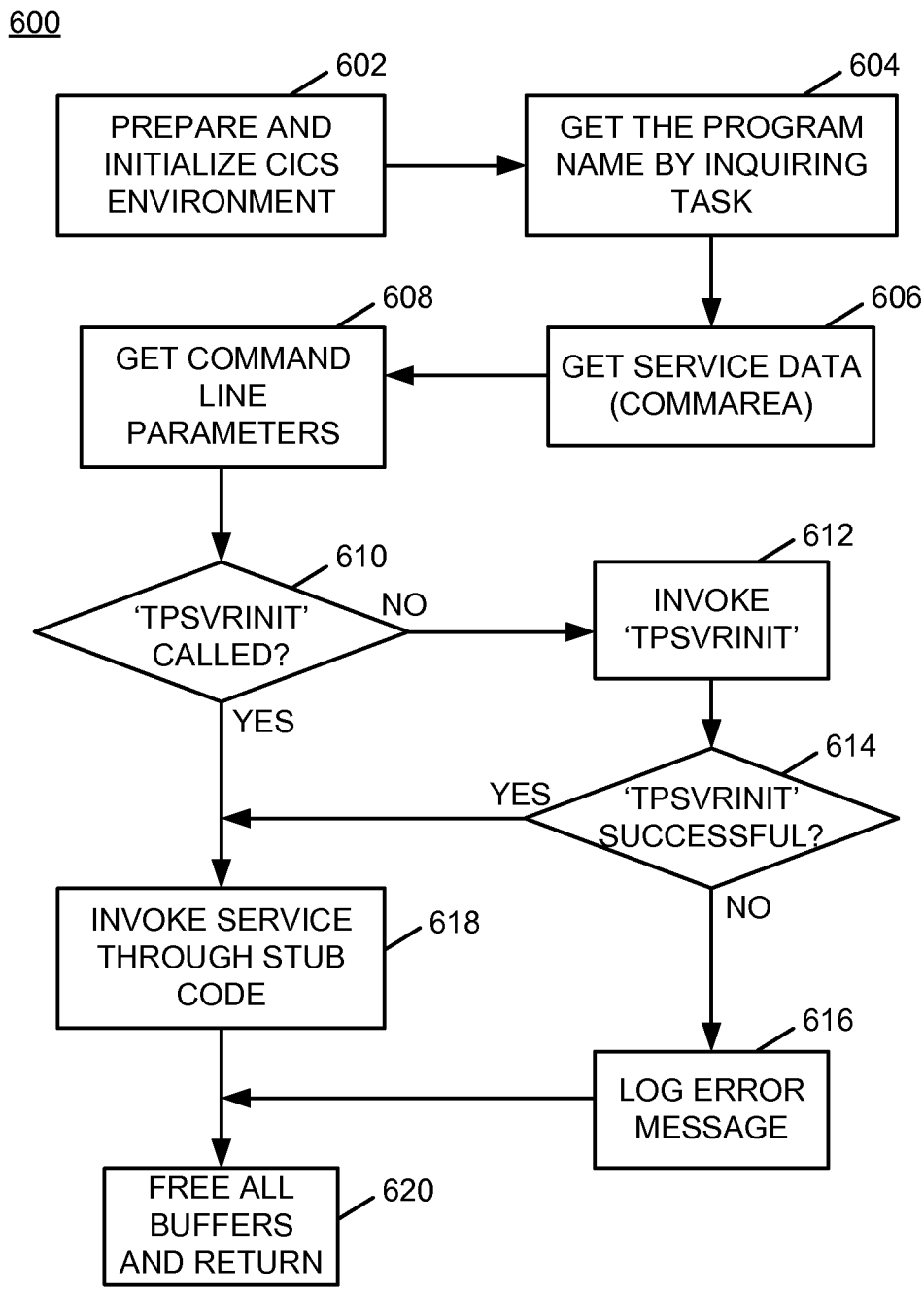
FIG. 6 is a flow chart of an example of an implementation of a process for deployment of a migrated Tuxedo® application in association with automated seamless migration of Tuxedo® applications to a CICS® hosting environment according to an embodiment of the present subject matter.

FIG. 6 is a flow chart of an example of an implementation of a process 600 for deployment of a migrated Tuxedo® application in association with automated seamless migration of Tuxedo® applications to a CICS® hosting environment. At block 602, the process 600 prepares the migrated application to start using the CICS® services and initializes the CICS® environment. The following example statement may allow the migrated application to start accessing the CICS® services. Within the following example statements, the acronym "EIB" references the CICS® "EXEC Interface Block."

EXEC CICS ADDRESS EIB ( . . . )

The functionality described in association with certain aspects of the process 600, such as the processing described in association with block 620, may be performed utilizing glue code, as described above. The following pseudo code represents example glue code that provides an initialization framework for services, and for invocation of appropriate services within the CICS® environment.

```
main( )
{
    TPSVCINFO _tpsvcinfo;
    ...
    /* Get the EIB block address */
    EXEC CICS ADDRESS EIB (dfheiptr);
    /* Retrieve the current task number */
    TaskId = ConvertBCDToInteger(dfheiptr->eibtaskn);
    /* Get the current program (or service) name */
    EXEC CICS INQUIRE TASK(TaskId) CURRENTPROG(PgmId);
    /* Retrieve any input data passed to the started task */
    EXEC CICS ADDRESS COMMAREA (&InputCommArea);
    ...
    prepareArguments(PgmId, Env, &svcargc, &svcargv);
    ...
    if (! InitedOnce)
    {
        ...
        /* Initialize the application */
        retcode = tpsvrinit(svcargc, svcargv);
        ...
    }
    /* Prepare the service definition */
    tpsvcinfo.data = InputCommArea;
    tpsvcinfo.len = dfheiptr->eibcalen
    ...
    /* Invoke the service */
    INVOKE_SVC(PgmId, &_tpsvcinfo);
    ...
    freeArgs(svcargc, svcargv);
    ...
}
```

The glue code provides linkages between existing Tuxedo® applications and the CICS® environment. For example, the glue code implements an entry point that allows the Tuxedo® application to run within the CICS® environment. The entry point prepares and initializes the CICS® environment, prepares the command-line parameters to be passed to the Tuxedo® application, identifies which services to be invoked, and passes the program data to the Tuxedo® application within the CICS® environment. The glue code may, for example, be compiled into a separate object code module that may be linked in with the compiled Tuxedo® application, the stub code, and the migration assistant library. Alternatively, the glue code may form a portion of the stub code without departure from the scope of the present subject matter.

At block 604, the process 600 gets the program name (or service name). As multiple services may be found in the same application module as described above, the glue code determines which CICS® application service module is being requested. This ensures that the appropriate Tuxedo® application service module is invoked as a function call through the stub code generated during the source code scan and application build process. The service name (or the program name) to be invoked may be determined using the following CICS® application programming interface (API) call.

EXEC CICS INQUIRE TASK( . . . ) PROGRAM( . . . )

At block 606, the process 600 gets program (or service) data from the calling program. Tuxedo® applications receive program data through the TPSVCINFO structure. In a CICS® environment, the program (or service) data is passed through the COMMAREA data buffer, which is retrieved using the following CICS® API call.

EXEC CICS ADDRESS COMMAREA( . . . )

Accordingly, the present subject matter assigns the COMMAREA data buffer to the TPSVCINFO structure and passes it to the applications in the CICS® environment.

At block 608, the process 600 gets command line parameters. Tuxedo® applications are built as an executable within the CICS® environment. As such, when the Tuxedo® application is started, it may be passed with the command line parameters which the Tuxedo® application may use. In a CICS® environment, the applications are built as loadable modules, and CICS® invokes the applications automatically when a service request is made. Accordingly, the present subject matter passes the existing command line parameters to the Tuxedo® applications in the CICS® environment. To implement this feature, the glue code reads all the command line parameters through a special environment variable with the following notation.

CLOPTS_<svc_name>=" . . . <command-line parameters> . . . "

Accordingly, every service may specify an environment variable like the example above and pass the command-line parameters via such an environment variable.

At decision point 610, the process 600 makes a determination as to whether "tpsvrinit" has been called for the migrated Tuxedo® application. Tuxedo® applications are initialized once at startup by invoking the "tpsvrinit" function call that is defined by the Tuxedo® application itself. The glue code enables this by calling the "tpsvrinit" function and ensuring it is called only once in the CICS® environment. As such, when a determination is made at decision point 610 that "tpsvrinit" has not been called, the process 600 invokes the "tpsvrinit" function at block 612.

At decision point 614, the process 600 makes a determination as to whether the call to "tpsvrinit" has executed successfully. When a determination is made that the call to "tpsvrinit" has not executed successfully or has returned an error, the process 600 logs an error message at block 616 and the service startup is terminated, as is the behavior within a Tuxedo® environment. When a determination is made at decision point 614 that the call to "tpsvrinit" has executed successfully, or upon determining at decision point 610 that "tpsvrinit" has been called for the migrated Tuxedo® application, the process 600 invokes the appropriate service through the generated stub code for the Tuxedo® application to ensure that the appropriate application service routine is invoked as a function call at block 618. The stub code matches the current service being invoked with the appropriate service function defined in the Tuxedo® application module.

Upon completion of execution of the function call to the appropriate service at block 618 or upon completion of error log processing at block 616, the process 600 frees any allocated buffers and returns control to the CICS® environment at block 620. Unlike Tuxedo® applications that do not terminate upon completion of a service function, when the service execution is complete within the CICS® environment, control is returned back to CICS® environment.

Figure 7:
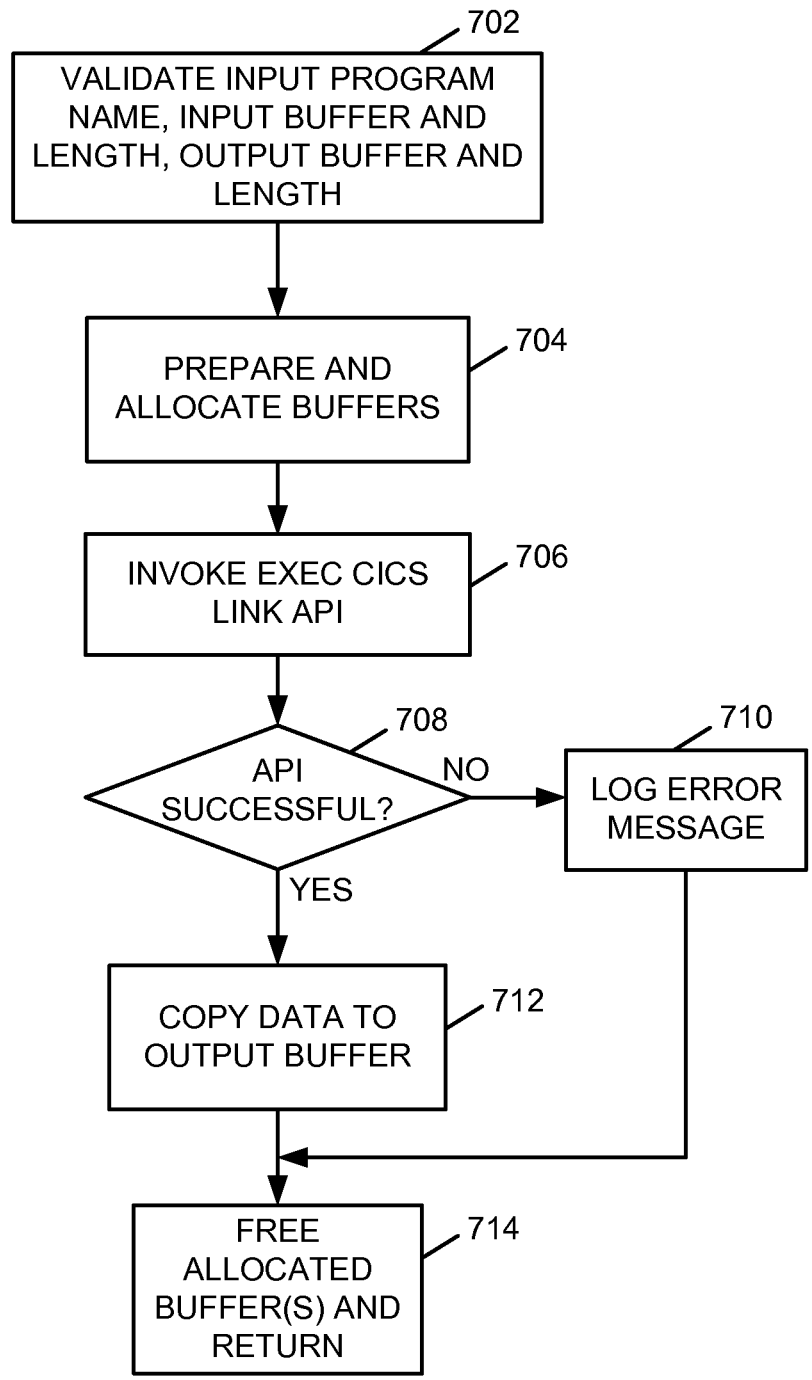
FIG. 7 is a flow chart of an example of an implementation of a process for processing of a service that may invoke a Tuxedo® application-to-trans action manager interface (ATMI) application programming interface (API) routine in association with automated seamless migration of Tuxedo® applications to a CICS® hosting environment according to an embodiment of the present subject matter.

FIG. 7 is a flow chart of an example of an implementation of a process 700 for processing of a service that may invoke a Tuxedo® application-to-transaction manager interface (ATMI) application programming interface (API) routine in association with automated seamless migration of Tuxedo® applications to a CICS® hosting environment. As described above, the migration assistant library (MAL) provides the implementation of Tuxedo® ATMI APIs and macro definitions. The interface of the re-defined APIs are maintained as-is in order to keep the applications unchanged. The following illustrates one of the same sample services invoking by a Tuxedo® ATMI API called "tpcall" that is mapped to the appropriate CICS® API called "EXEC CICS LINK." The return codes, such as the error codes, propagated from each of the implementation of Tuxedo® APIs (which would now propagate CICS® errors or exceptions), are mapped back to the Tuxedo® specific error definitions. Other differences may also be addressed in a similar manner by mapping the available functionality between the two products and/or environments.

At block 702, the process 700 validates the input parameters for the "tpcall" interface for correctness. Within the present example, the input program name, input buffer name and buffer length, and the output buffer name and buffer length are validated. Appropriate error codes may be propagated in a Tuxedo®-specific style, if any error conditions are detected during the validation.

At block 704, the process 700 prepares and allocates the respective data buffers. For purposes of the present example, it is noted that the "tpcall" interface has an option to specify separate data buffers for input and output data simultaneously. However, in a CICS® environment, a single data buffer is used for both input and output data (e.g., COMMAREA). In order to comply with the "tpcall" interface, appropriate buffers are allocated and the output data buffers specified in the "tpcall" are populated before returning to the caller.

At block 706, the process 700 invokes the CICS® "EXEC CICS LINK" API call. The CICS® API "LINK" is used as an equivalent functionality for the "tpcall" interface. This API/interface may be used to invoke other CICS® programs/services within the same transaction context.

At decision point 708, the process 700 makes a determination as to whether the call to the CICS® API "LINK" is successful. When a determination is made that the invocation of "EXEC CICS LINK" API is unsuccessful, the process 700 returns the appropriate Tuxedo®-specific error code to the caller at block 710. In response to a determination that the invocation of "EXEC CICS LINK" API is successful, the process 700 copies data resulting from the CICS® API "LINK" API call to the appropriate output buffer(s) specified in the "tpcall" interface at block 712.

Upon completion of copying the resulting data to the defined output buffer(s) at block 712, or upon completion of returning the appropriate Tuxedo®-specific error code to the caller at block 710, the process 700 frees all allocated buffers, frees memory allocated for managing the input and output buffers, and returns control to the CICS® environment at block 714. As such, the process 700 provides one detailed example of a mapped Tuxedo® API call to a CICS® API call.

As described above in association with FIG. 1 through FIG. 7, the example systems and processes provide automated seamless migration of Tuxedo® applications to a CICS® hosting environment. Many other variations and additional activities associated with automated seamless migration of Tuxedo® applications to a CICS® hosting environment are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method, comprising:
parsing, via an application migration module, source code for a transactions on Unix extended for distributed operation application;

identifying at least one application service routine that each specifies an associated transactions on Unix extended for distributed operation service within the parsed source code, where at least one identified application service routine comprises at least one associated application-to-transaction manager (ATMI) application programming interface (API) routine;

generating stub code comprising an invocation call for an associated customer information control system service for each application service routine identified within the source code; and creating a customer information control system environment executable based upon the source code, the stub code, glue code, and a migration library comprising, for each associated ATMI API routine, a mapping routine that processes data format differences between each ATMI API routine and at least one associated customer information control system API routine.

2. The method of claim 1, further comprising deploying the created customer information control system environment executable within a customer information control system environment.

3. The method of claim 2, further comprising:

in response to invocation of an application service routine within the customer information control system environment, allocating, via each associated mapping routine within the migration library, input and output buffer space within a common area buffer of the customer information control system environment that maps the data format differences between each associated ATMI API routine and the at least one associated customer information control system API routine; and de-allocating, in response to completion of the application service routine, the allocated input and output buffer space from the common area buffer of the customer information control system environment.

4. The method of claim 2, where deploying the created customer information control system environment executable within the customer information control system environment comprises registering each identified application service routine as the associated customer information control system service within the customer information control system environment.

5. The method of claim 4, further comprising, in response to each invocation of each registered application service routine:

loading, within the customer information control system environment, the customer information control system environment executable;

executing the invoked application service routine; and unloading the customer information control system environment executable from the customer information control system environment in response to completion of execution of the invoked application service routine.

6. The method of claim 1, where the glue code provides an initialization framework for each identified application service routine and invokes the associated customer information control system service within a customer information control system environment for each identified application service routine.

7. The method of claim 1, where:

at least one of the ATMI API routines maps to a plurality of customer information control system API routines; and the migration library comprises, for the at least one ATMI API routine, a mapping routine that processes data format differences between the at least one ATMI API routine and the plurality of customer information control system API routines.

8. The method of claim 1, where creating the customer information control system environment executable based upon the source code, the stub code, the glue code, and the migration library comprising, for each associated ATMI API routine, the mapping routine that processes the data format differences between each ATMI API routine and the at least one associated customer information control system API routine comprises creating the customer information control system environment executable without changing the source code for the transactions on Unix extended for distributed operation application.

9. A system, comprising:

a memory; and a processor programmed to:

parse source code for a transactions on Unix extended for distributed operation application;

identify at least one application service routine that each specifies an associated transactions on Unix extended for distributed operation service within the parsed source code, where at least one identified application service routine comprises at least one associated application-to-transaction manager (ATMI) application programming interface (API) routine;

generate stub code comprising an invocation call for an associated customer information control system service for each application service routine identified within the source code; and create a customer information control system environment executable within the memory based upon the source code, the stub code, glue code, and a migration library comprising, for each associated ATMI API routine, a mapping routine that processes data format differences between each ATMI API routine and at least one associated customer information control system API routine.

10. The system of claim 9, where the processor is further programmed to deploy the created customer information control system environment executable within a customer information control system environment.

11. The system of claim 10, where the processor is further programmed to:

in response to invocation of an application service routine within the customer information control system environment, allocate, via each associated mapping routine within the migration library, input and output buffer space within a common area buffer of the customer information control system environment that maps the data format differences between each associated ATMI API routine and the at least one associated customer information control system API routine; and de-allocate, in response to completion of the invoked application service routine, the allocated input and output buffer space from the common area buffer of the customer information control system environment.

12. The system of claim 10, where, in being programmed to deploy the created customer information control system environment executable within the customer information control system environment, the processor is programmed to register each identified application service routine as the associated customer information control system service within the customer information control system environment.

13. The system of claim 12, where the processor is further programmed to, in response to each invocation of each registered application service routine:

load, within the customer information control system environment, the customer information control system environment executable;

execute the invoked application service routine; and unload the customer information control system environment executable from the customer information control system environment in response to completion of execution of the invoked application service routine.

14. The system of claim 9, where the glue code provides an initialization framework for each identified application service routine and invokes the associated customer information control system service within a customer information control system environment for each identified application service routine.

15. The system of claim 9, where:
at least one of the ATMI API routines maps to a plurality of customer information control system API routines; and
the migration library comprises, for the at least one ATMI API routine, a mapping routine that processes data format differences between the at least one ATMI API routine and the plurality of customer information control system API routines.

16. The system of claim 9, where, in being programmed to create the customer information control system environment executable based upon the source code, the stub code, the glue code, and the migration library comprising, for each associated ATMI API routine, the mapping routine that processes the data format differences between each ATMI API routine and the at least one associated customer information control system API routine, the processor is programmed to create the customer information control system environment executable without changing the source code for the transactions on Unix extended for distributed operation application.

17. A computer program product comprising a computer readable storage medium including computer readable program code, where the computer readable program code when executed on a computer causes the computer to:

parse source code for a transactions on Unix extended for distributed operation application;

identify at least one application service routine that each specifies an associated transactions on Unix extended for distributed operation service within the parsed source code, where at least one identified application service routine comprises at least one associated application-to-transaction manager (ATMI) application programming interface (API) routine;

generate stub code comprising an invocation call for an associated customer information control system service for each application service routine identified within the source code; and create a customer information control system environment executable based upon the source code, the stub code, glue code, and a migration library comprising, for each associated ATMI API routine, a mapping routine that processes data format differences between each ATMI API routine and at least one associated customer information control system API routine.

18. The computer program product of claim 17, where the computer readable program code when executed on the computer further causes the computer to deploy the created customer information control system environment executable within a customer information control system environment.

19. The computer program product of claim 18, where the computer readable program code when executed on the computer further causes the computer to:

in response to invocation of an application service routine within the customer information control system environment, allocate, via each associated mapping routine within the migration library, input and output buffer space within a common area buffer of the customer information control system environment that maps the data format differences between each associated ATMI API routine and the at least one associated customer information control system API routine; and de-allocate, in response to completion of the invoked application service routine, the allocated input and output buffer space from the common area buffer of the customer information control system environment.

20. The computer program product of claim 18, where in causing the computer to deploy the created customer information control system environment executable within the customer information control system environment, the computer readable program code when executed on the computer causes the computer to register each identified application service routine as the associated customer information control system service within the customer information control system environment.

21. The computer program product of claim 20, where the computer readable program code when executed on the computer further causes the computer to, in response to each invocation of each registered application service routine:

load, within the customer information control system environment, the customer information control system environment executable;

execute the invoked application service routine; and unload the customer information control system environment executable from the customer information control system environment in response to completion of execution of the invoked application service routine.

22. The computer program product of claim 17, where the glue code provides an initialization framework for each identified application service routine and invokes the associated customer information control system service within a customer information control system environment for each identified application service routine.

23. The computer program product of claim 17, where:
at least one of the ATMI API routines maps to a plurality of customer information control system API routines; and
the migration library comprises, for the at least one ATMI API routine, a mapping routine that processes data format differences between the at least one ATMI API routine and the plurality of customer information control system API routines.

24. The computer program product of claim 17, where in causing the computer to create the customer information control system environment executable based upon the source code, the stub code, the glue code, and the migration library comprising, for each associated ATMI API routine, the mapping routine that processes the data format differences between each ATMI API routine and the at least one associated customer information control system API routine, the computer readable program code when executed on the computer causes the computer to create the customer information control system environment executable without changing the source code for the transactions on Unix extended for distributed operation application.

* * * * *